DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 21, 1972

896 O.G. 833

T896,044

SOLID SCINTILLATORS

Lorenzo Federico Costa, Frank Grum, and James Albert Van Allan, all % Eastman Kodak Co., Kodak Park Division, Rochester, N.Y. 14650

Filed Mar. 4, 1971, Ser. No. 121,135

**Int. Cl. G01t *1/20***

U.S. Cl. 250—71.5 R

No Drawing. 15 Pages Specification

This invention relates to solid scintillators which are 2-aryl-4-sec-amino-benzo[b]pyrylium salts or 2-aryl-4-sec-aminobenzo[b]thiapyrylium salts. The solid scintillators which may be employed according to the invention can be represented by the structural formula:

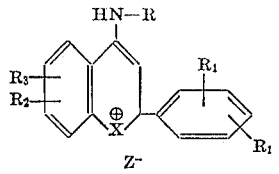

wherein X is a sulfur or oxygen atom; Z is an anionic function as exemplified by perchlorate, halides, fluoroborate, sulfonate and the like; R is an alkyl or aryl group; each of $R_1$ can be a hydrogen atom, an alkyl group or an alkoxy group; and $R_2$ and $R_3$ each can be a hydrogen atom or when taken together are attached to adjacent carbon atoms and represent the atoms necessary to form a fused cyclic aromatic moiety such as benzo or naphtho and substituted fused aromatic rings. The preferred compounds are 4-butylamino-2-(4-methoxyphenyl)benzo[b]pyrylium perchlorate, 4-butylamino-2-(4-methoxyphenyl)benzo[b]pyrylium fluoroborate and (4-benzylamino)-2-phenylbenzo[b]pyrylium perchlorate.

The solid scintillators are advantageously employed in the continuous monitoring of beta-radiation in effluents, particularly in conjunction with liquid column chromatography.